United States Patent [19]

Rodriguez-Cavazos

[11] Patent Number: 4,935,674
[45] Date of Patent: Jun. 19, 1990

[54] DIGITALLY CONTROLLED CONVERGENCE SYSTEM

[75] Inventor: Enrique Rodriguez-Cavazos, Indianapolis, Ind.

[73] Assignee: RCA Licensing Corporation, Princeton, N.J.

[21] Appl. No.: 290,004

[22] Filed: Dec. 27, 1988

[51] Int. Cl.⁵ .................. H01J 29/70; H01J 29/76
[52] U.S. Cl. ........................................ 315/368
[58] Field of Search ........................ 315/368, 367

[56] References Cited

U.S. PATENT DOCUMENTS 4,441,057 4/1984 Wrona ............................ 315/368

Primary Examiner—Theodore M. Blum
Attorney, Agent, or Firm—Joseph S. Tripoli; Joseph J. Laks; Harvey D. Fried

[57] ABSTRACT

A multi-channel, multiple deflection waveform generator for a convergence control system and the like comprises an analog circuit source for a plurality of basic waveforms and a basic waveform processor for each of a plurality of channels. Each of the channel processors may comprise a plurality of circuits for modifying the basic waveforms, a circuit for combining any combination of modified waveforms to form a specifically configured composite waveform and a remotely controllable shift register for independently setting each of the plurality of modifying circuits from a central control, for example, by means of an existing serial bus. Each of the modifying circuits may comprise a first part for altering the scale of one of the basic waveforms and a second part for altering the gain of the same one of the basic waveforms. Each of the remotely controlled shift registers has a setting for selecting any one of a plurality of predetermined operating conditions for one of the first and second parts of the modifying circuit. In one embodiment, the operating condition for the other one of the first and second modifying parts may be preselected and fixed. In another embodiment, another shift register may store a second setting for selecting any one of a second plurality of predetermined operating conditions for the other of the first and second parts of the modifying circuit. Each channel processor may be remotely controlled to generate a specifically configured composite waveform, for example, for driving a different one of a plurality of deflection coils in the convergence yokes of a projection television. The invention may also be embodied as a custom analog waveform generating module adapted to operate within the digital control architecture of a host apparatus, such as a television, video recorder or the like.

25 Claims, 7 Drawing Sheets

WAVEFORM SHAPER ASSIGNMENT CHART

| BASIC WAVEFORM | | CHANNEL 1 BLUE HORIZONTAL | CHANNEL 2 BLUE VERTICAL | CHANNEL 3 RED HORIZONTAL | CHANNEL 4 RED VERTICAL | CHANNEL 5 GREEN HORIZONTAL | CHANNEL 6 GREEN VERTICAL |
|---|---|---|---|---|---|---|---|
| NO. | SHAPE | 21 | 22 | 23 | 24 | 25 | 26 |
| 1 | HORIZONTAL PARABOLA | WF 1 | WF 1 | WF 1 | WF 1 | | |
| 2 | HORIZONTAL RAMP | WF 2 | WF 2 | WF 2 | WF 2 | | |
| 3 | VERTICAL PARABOLA | WF 3 | WF 3 | WF 3 | WF 3 | | |
| 4 | VERTICAL RAMP | WF 4 | WF 4 | WF 4 | WF 4 | | |
| 5 | VERTICAL PARABOLA * HORIZONTAL RAMP | WF 5 | | WF 5 | | WF 5 | |
| 6 | VERTICAL HALF RAMP * HORIZONTAL PARABOLA | | WF 6 | | WF 6 | | WF 6 |
| 7 | VERTICAL RAMP * HORIZONTAL RAMP | WF 7 | WF 7 | WF 7 | WF 7 | WF 7 | |
| 8 | VERTICAL HALF RAMP * HORIZONTAL RAMP | | WF 8 | | WF 8 | | |
| 9 | VERTICAL RAMP * HORIZONTAL HALF RAMP | WF 9 | | WF 9 | | | |
| 10 | VERTICAL PARABOLA * HORIZONTAL HALF RAMP | WF10 | | WF10 | | | |
| 11 | VERTICAL RAMP * HORIZONTAL PARABOLA | | WF11 | | WF11 | | WF11 |
| 12 | DC LEVEL | WF12 | WF12 | WF12 | WF12 | | |

*FIG. 5*

DIGITALLY CONTROLLED CONVERGENCE SYSTEM

This invention relates generally to the field of deflection systems for cathode ray tubes, and in particular, to the generation of deflection waveforms for driving deflection coils of convergence yokes for cathode ray tubes in projection televisions and the like.

Cathode ray tubes used in televisions are subject to distortion of the video image on the cathode ray tube faceplate raster. Such distortions include east-west pin distortion, north-south pin distortion, horizontal nonlinearity and vertical nonlinearity. Projection televisions, which require a mechanical alignment between three cathode ray tubes, not only magnify those raster distortions otherwise present on the cathode ray tube faceplate raster, but add new distortions as well. These include horizontal and vertical trapezoid distortion, skew and bow. The projected image is highly distorted, at best, if left uncorrected. The problem of correcting these distortions is especially difficult. The distortions present for each of the three colors is different because the cathode ray tube to screen alignment for each color is different.

In order to correct these distortions, projection televisions are normally provided with an auxiliary deflection yoke for each of the three cathode ray tubes. These auxiliary deflection yokes are commonly referred to as convergence yokes.

The coils of the convergence yokes are excited with appropriate current waveforms for correcting the images on the projection screen. Such waveforms typically consist of combinations of vertical and horizontal rate parabolas, ramps and half ramps, and the product of such parabolas, ramps and half ramps with one another. Each of the three cathode ray tubes requires a horizontal correction coil and a vertical correction coil in its convergence yoke. Since the amplitudes and shapes of the correction waveforms needed to excite each of the six coils in the three deflection yokes are different, a wide variety of corrective waveforms is required. Each corrective deflection signal must be fed to one of six output amplifiers, which provides sufficient power to drive one of the six coils.

Each corrective deflection waveform may be constructed by algebraically summing two or more of a plurality of basic waveforms, provided that some means is available to modify the scale and/or gain of each basic waveform prior to summing. Typically, twelve basic waveforms may be used for developing each necessary deflection waveform as a composite waveform constructed by summing any number of the modified basic waveforms. The basic waveforms include: a horizontal parabola; a horizontal ramp; a vertical parabola; a vertical ramp; the product of a vertical parabola and a horizontal ramp; the product of a vertical half ramp and a horizontal parabola; the product of a vertical ramp and a horizontal ramp; the product of a vertical half ramp and horizontal ramp; the product of a vertical ramp and a horizontal half ramp; the product of a vertical parabola and a horizontal half ramp; the product of a vertical ramp and a horizontal parabola; and, a DC level. The chart in FIG. 5 illustrates which basic waveforms may be combined to develop the necessary composite waveform for each of the six deflection coils of the three convergence yokes. Various projection television geometries may require a smaller or larger number of such basic waveforms, but the chart shown in FIG. 5 is typical with regard to complexity of the problem.

Random factors such as manufacturing tolerances in both mechanical and electronic components, as well as variations in cabinets or housings, as well as the ultimate operating environment, make it difficult, if not impossible as a practical matter, to precisely predict and generate the necessary correction waveforms in advance. On the contrary, it is often necessary to carefully adjust each of the correction waveforms not only for its own accuracy, but with regard to the effect which it has on the other correction waveforms. As can be appreciated by the chart of FIG. 5, the illustrative example shows that the twelve basic waveforms are modified by a total of forty operations prior to summing, and that each channel is a different combination of the waveforms to be summed. Heretofore, the time and difficulty of calibrating the twelve basic sources, the forty or so modifying circuits and the six summing circuits has been substantial. As an example, each modifying circuit typically requires at least one adjustable potentiometer, at least forty in all. In order to overcome such setup problems, and in order to afford an important measure of flexibility in servicing and/or recalibrating such projection television sets, a feature of this invention provides a digitally, remotely controllable, multi-channel, multiple waveform generator.

It is a further aspect of this invention that the remote control may be incorporated into the digital control system architecture which exists in many, if not all digitally controlled televisions, particularly projection televisions. These digital controlled systems provide for setup information to be stored in nonvolatile memory, for example, electronically erasable and programmable read-only memories, such as EEPROMs. Whenever the television is turned on, control information stored in the EEPROMs, for example, tint control, is automatically loaded into shift registers, the outputs of which control the tint circuits of the television. Typically, a central controller which generates any necessary address, data and clock signals, establishes communication on a serial data bus between the EEPROMs and the remote registers. A bus decoder, for converting the serial data stream to parallel format, loads the remote shift registers. Therefore, a digitally controlled convergence control system according to this invention may be integrated with the existing digital control architecture now found in many such digitally controlled televisions.

Fully digital convergence control systems have been proposed, wherein the correction waveforms are generated by digital codes stored in a memory and mapped for each point on a screen, on a grid basis. The digital signals must be converted to analog signal waveforms for application to the deflection coils. Substantial difficulties are encountered in interpolating between adjacent vertical points due to the need for successive horizontal scans to produce the video images. Moreover, even when operative such systems are too expensive to incorporate into consumer products and most professional products as well. Accordingly, it is another advantageous aspect of the invention to provide for the analog generation of a plurality of basic waveforms and the digitally remotely controlled modification of each of those waveforms in each of a plurality of channels. Each of the channels is adapted to generate a different corrective waveform and to provide for the summation of any combination of modified waveforms in each channel. The invention is a significant improvement over fully analog systems in convenience and picture quality. In terms of cost, the invention is not only less expensive to implement than a fully digital system, the invention is less expensive to implement than existing fully analog convergence control systems.

Depending upon the manner in which the control source is incorporated into the basic digital control architecture, which may be through an infrared remote controller or through a plug-in terminal, for example, the convergence of the television may be conveniently set initially, and may be conveniently adjusted for recalibration if and as when necessary. It is a further aspect of the invention to incorporate the convergence system into one or a small number of integrated circuits by large scale integration techniques.

A feature of the invention is a multiple deflection waveform generator that comprises a multiple signal generator for generating a plurality of basic waveforms; a plurality of circuits for independently modifying each of the basic waveforms; and, at least one summing circuit for algebraically summing any combination of modified waveforms to form a composite waveform, for example, a waveform specifically configured to drive a deflection coil in a convergence yoke. The waveform generator may further comprise a central control for remotely and independently setting each of the plurality of modifying circuits; and, a data bus for connecting the central control to each of the plurality of modifying circuits.

Another aspect of the invention comprises a multi-channel, multiple deflection waveform generator that includes a basic waveform processor for each of a plurality of channels. Each of the processors may comprise a plurality of the circuits for independently modifying the basic waveforms; one of the circuits for summing any combination of modified waveforms to form a specifically configured composite waveform; and, a remotely controllable shift register for independently setting each of the plurality of modifying circuits.

Each of the modifying circuits may comprise a first part for altering the scale of one of the basic waveforms and a second part for altering the gain of the same one of the basic waveforms. Each shift register stores a setting for selecting any one of a plurality of predetermined operating conditions for one of the first and second parts of the modifying circuit. In one embodiment, the operating condition for the other one of the first and second modifying parts may be preselected and fixed. In another embodiment, a second shift register may store a second setting for selecting any one of a second plurality of predetermined operating conditions for the other of the first and second parts of the modifying circuit. Each channel may be remotely controlled over a data bus to generate a composite waveform, for example, a waveform specifically configured to drive a different one of a plurality of deflection coils in the convergence yokes of a projection television.

FIG. 5 is a chart identifying the basic waveforms and different combinations of the basic waveforms necessary for developing the composite deflection waveform for each of the six channels of a convergence correction system in a projection television.

Figure 1:
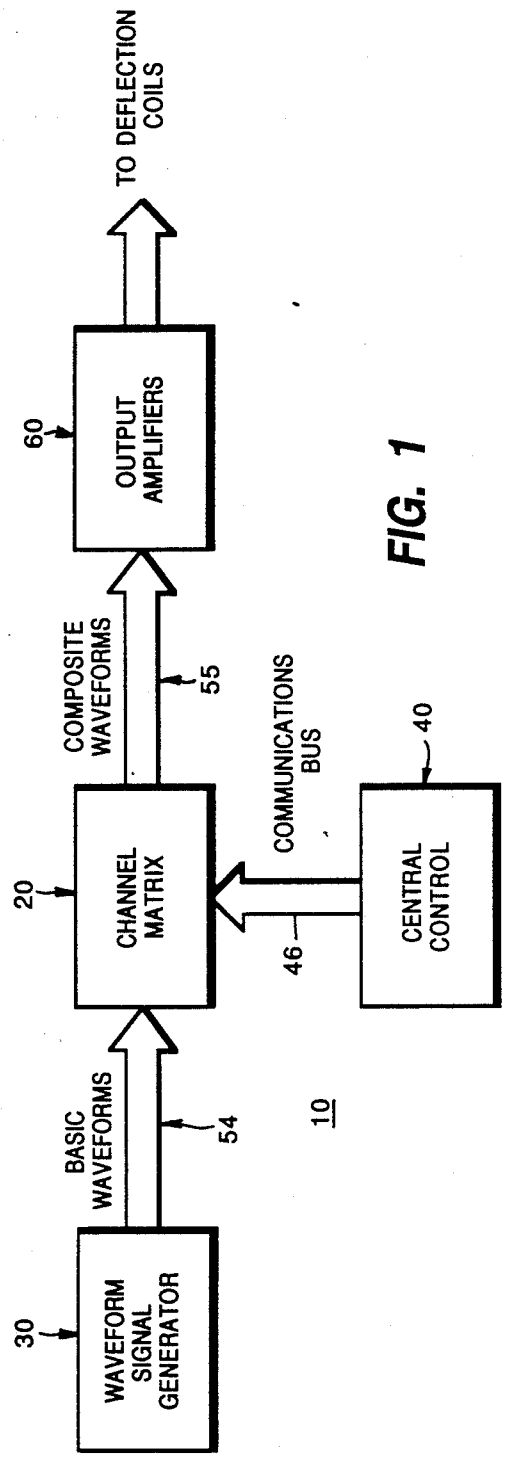
FIG. 1 is an overall block diagram of a multi-channel, multiple deflection waveform generator according to this invention.

A multi-channel, multiple deflection waveform generator 10, which may be used as a convergence control circuit, is shown in block diagram form in FIG. 1. The waveform generator 10 comprises a channel matrix 20 receiving multiply selectable inputs in the form of basic waveforms from analog waveform signal generator 30 and control inputs on data bus 46 in the form of data, address and control information from central control 40. The channel matrix 20 generates a plurality of composite waveforms on signal bus 55, which are then transmitted by a multi-channel output amplifier 60 to deflection coils, for example, in the convergence yokes of a projection television. The architecture of the waveform generator 10 is adapted to conform to, and be easily integrated with the existing architecture which is typical of digitally controlled television sets, and in particular, digitally controlled projection television sets.

Figure 2:
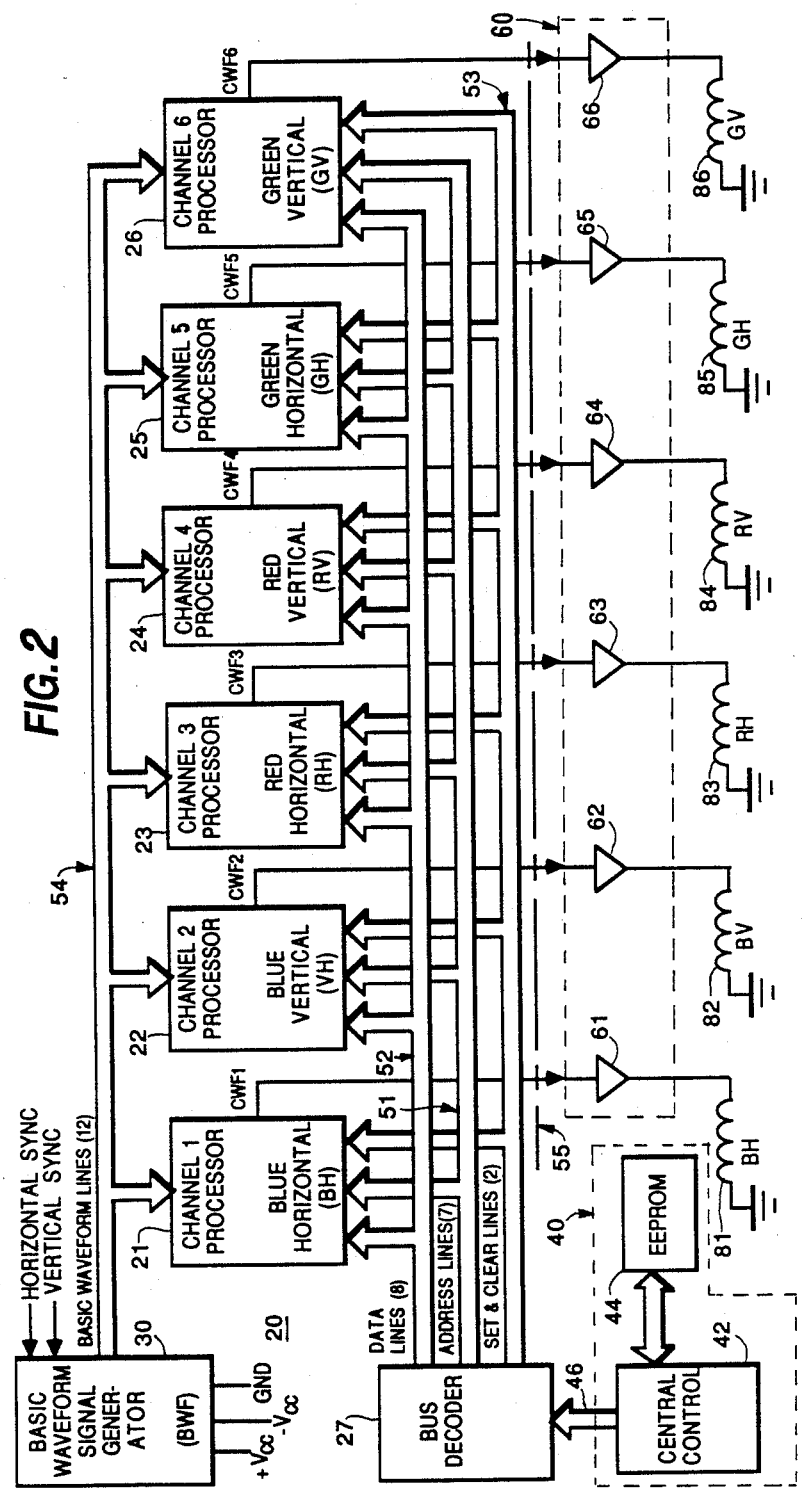
FIG. 2 is a block diagram of the waveform generator shown in FIG. 1, with the channel matrix and output amplifiers shown in more detail.

With further reference to FIG. 2, the channel matrix 20 and the multi-channel output amplifier 60 are shown in greater detail. The channel matrix 20 comprises a plurality of channel processors 21 through 26 for generating respective composite deflection waveforms CWF1 through CWF6. Inasmuch as the three convergence yokes necessary for a projection television have a combined total of six deflection coils, the invention is illustrated as a six channel waveform generator. Channel 1 processor 21 is intended to generate a first composite waveform CWF1 for driving the blue horizontal convergence coil. Channel 2 processor 22 is intended to generate a second composite waveform CWF2 for driving the blue vertical convergence coil. Channel 3 processor 23 is intended to generate a third composite waveform CWF3 for the red horizontal convergence coil. Channel 4 processor 24 is intended to generate a fourth composite waveform CWF4 for driving the red vertical convergence coil. Channel 5 processor 25 is intended to generate a fifth composite waveform CWF5 for driving the green horizontal convergence coil. Channel 6 processor 26 is intended to generate a sixth composite waveform CWF6 for driving the green vertical convergence coil.

Each of the twelve basic waveforms BWF1 through BWF12 generated by the basic waveform signal generator 30 is provided as an input to each of the channel processors 21 through 26 by basic waveform bus 54. The channel processors are connected to bus decoder 27 by a data bus comprising address lines 51, data lines 52 and set and clear control signal lines 53. The numbers of data lines and address lines illustrated are sufficient to handle each of twelve waveshape modifying circuits in each of the six channel processors. The actual number of data lines and address lines will depend upon the number of waveshape modifying circuits actually utilized. The use of two control signal lines, for set and clear strobe signals, is merely illustrative. The basic control information is loaded into nonvolatile memory 44, in the form of an EEPROM. Whenever the television is turned on, a microprocessor software program in a central control 42 loads all of the information in the EEPROM 44 into shift registers through one or more bus decoders 27 located remotely on serial bus 46, for controlling different aspects of television operation.

The composite waveforms are directed to the respective inputs of a multi-channel amplifier 60. Multi-channel amplifier 60 comprises six output amplifiers 61 through 66. The amplifiers of circuit 60 may be of conventional design and are not shown in detail. Each of the amplifiers receives one of the composite waveforms as an input, and drives one of six convergence coils 81 through 86 as an output. Convergence coil 81 corresponds to blue horizontal convergence correction; convergence coil 82 corresponds to blue vertical convergence correction; convergence coil 83 corresponds to red horizontal convergence correction; convergence coil 84 corresponds to red vertical convergence correction; convergence coil 85 corresponds to green horizontal convergence correction; and, convergence coil 86 corresponds to green vertical convergence correction.

In order that the basic waveforms be timed correctly for providing the necessary image correction, the basic waveform signal generator 30 is provided with horizontal and vertical synchronizing signals.

Figure 3:
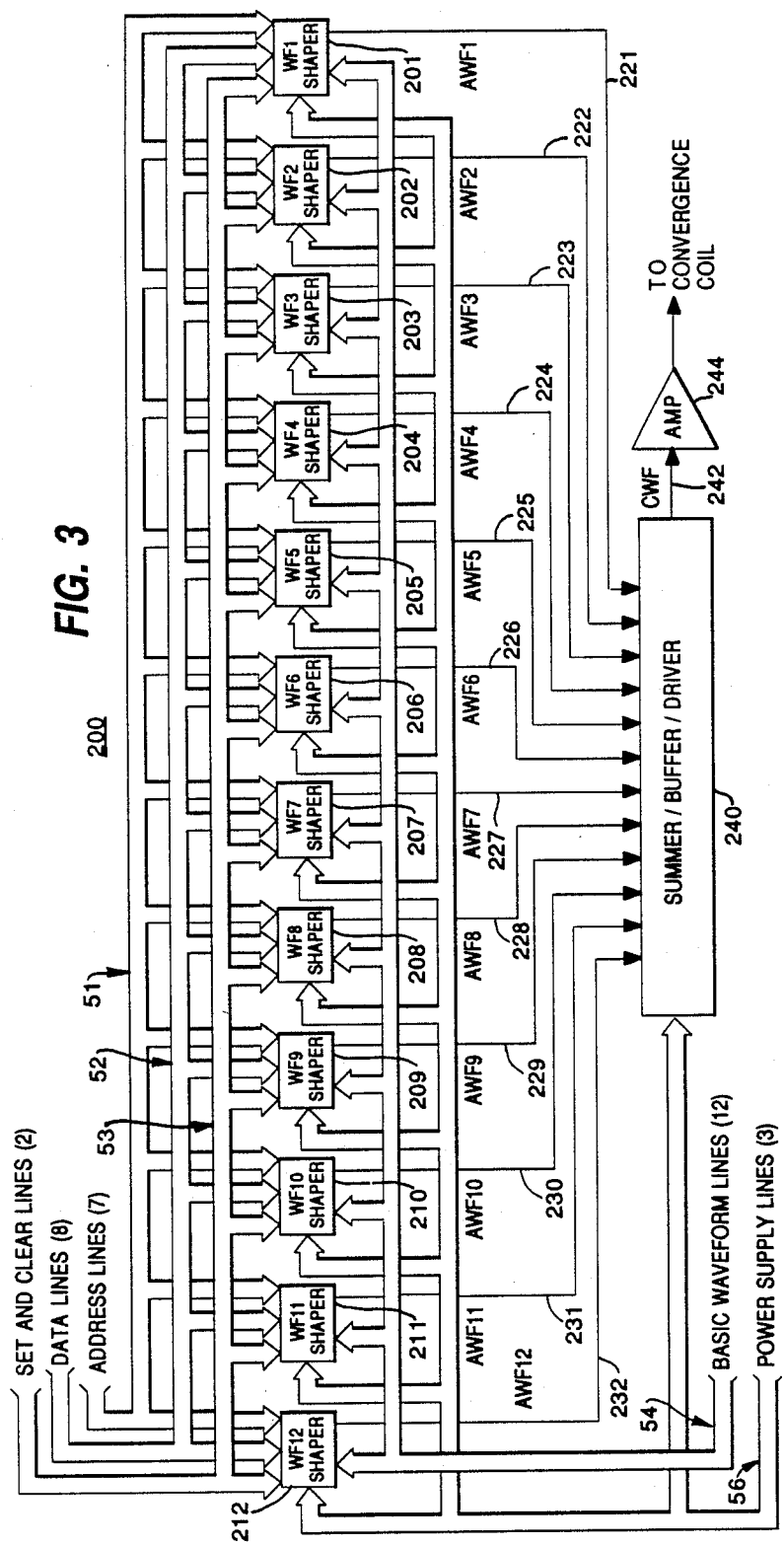
FIG. 3 is a block diagram of one of the channel processors shown in FIG. 2.

The channel processor 200 shown in FIG. 3 is illustrative of a channel processor in accordance with an aspect of the invention, wherein each basic waveform is an input to each channel processor and each channel processor is capable of independently modifying each of the basic waveforms. Moreover, each channel processor 200 is further capable of selecting any number of modified waveforms for summing as a composite waveform.

Twelve waveform shapers for each of the basic waveforms BWF1 through BWF12 are identified by reference numerals 201 through 212 respectively. Each of the waveform shapers is connected to a bus decoder by a data bus comprising address lines 51, data lines 52, and set and clear lines 53. Data bus 54 for the basic waveform lines is a local bus, as is the bus for the power supply lines 56. If each of the six channels is provided with twelve waveform shapers, the waveform generator will comprise seventy-two waveform shapers. Seven address lines are the minimum number necessary to uniquely identify the seventy-two waveform shapers. A single bus decoder may be provided for the entire system, that is, all six channels. Alternatively, one or more bus decoders may be provided for each channel.

Each of the waveform shapers WF1 through WF12 is capable of generating an adjusted waveform as an output, AWF1 through AWF12. The adjusted waveforms are combined with one another. Each may be transmitted on lines 221 through 232 respectively, as an input to a summer/buffer/driver 240. The summer/buffer/driver 240 is capable of combining the inputs by algebraically summing inputs from any combination of the waveform shapers, for generating a composite waveform CWF as an output on line 242. An output amplifier 244, similar to amplifiers 61 through 66, drives a convergence coil or the like. Whether or not a signal bus 55 is necessary as such will depend upon the relative locations of the summer/buffer/drivers and the multi-channel output amplifier 60.

Correction waveforms for convergence coils require positive and negative excursions, and accordingly, power supply bus 56 is shown as comprising 3 lines, for positive supply voltage $+V_{cc}$, negative supply voltage $-V_{cc}$ and ground.

Figure 4:
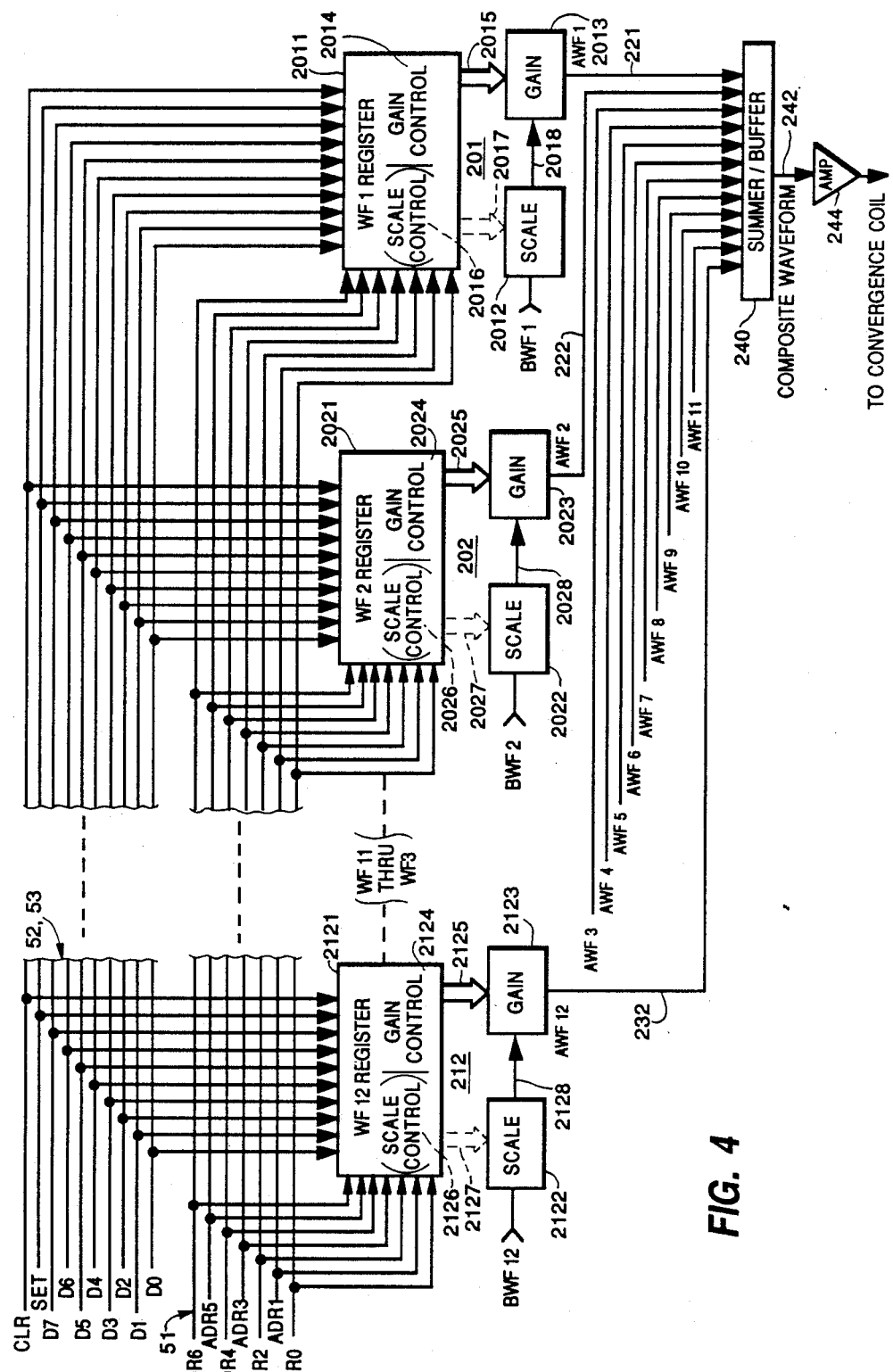
FIG. 4 is a block diagram of the channel processor shown in FIG. 3, wherein the waveform shapers are shown in more detail.

The detailed configuration of the waveform shapers is illustrated in FIG. 4. Waveform shaper 201 comprises a WF1 shift register 2011, a scale modifying circuit 2012 and a gain modifying circuit 2013. The gain modifying circuit 2013 operates in response to signals generated by the gain control portion 2014 of shift register 2011 on data lines 2015. In the embodiment illustrated, the scale modifying circuit 2012 provides an operating condition or modification for the first basic waveform which is preselected and fixed. In an alternative embodiment, the implementation of which is denoted by dotted lines, scale modifying circuit 2012 operates responsive to signals from a scale control portion 2016 of shift register 2011, transmitted by data lines 2017.

In a similar fashion, waveform shaper 202 comprises a WF2 shift register 2021, a scale modifying circuit 2022 and a gain modifying circuit 2023. The gain modifying circuit 2023 operates responsive to gain control portion 2024 of WF2 shift register 2021, by signals transmitted on data lines 2025. The operation of scale modifying means 2022 is preselected and fixed, but in the alternative embodiment, scale modifying circuit 2022 may operate responsive to signals generated by scale control portion 2026, transmitted by data lines 2027.

Likewise, waveform shaper 212 comprises a WF12 shift register 2121, scale modifying circuit 2122, gain modifying circuit 2123, gain control portion 2124, data lines 2125, and optionally, scale control portion 2126 and data lines 2127.

In an alternative embodiment, the shift registers may be nonvolatile, for example, EEPROMs. This would eliminate the need for additional nonvolatile memory in the central control circuitry.

In order to provide uniformity in certain embodiments, it may be desirable that each of the gain modifying circuits in each of the waveform shapers in each of the channels be identical to one another. Accordingly, the basic waveforms may be scaled to limit the maximum amplitudes thereof prior to further processing. A specifically configured circuit may be provided for each scale modifying circuit to accommodate the particular scale factor necessary for that particular waveform and that particular channel. The scale modified waveforms may thereafter be fully remotely controlled by the shift registers and gain modifying circuits over the data bus by the central control.

As indicated by the chart of FIG. 5, it is unnecessary to utilize each of the basic waveforms in each channel. Channels 1 through 4 utilize nine of the twelve basic waveforms, whereas channels 5 and 6 each utilize only two of the basic waveforms. However, none of the channels uses the same waveforms and the waveforms must be scale modified and gain modified differently for each channel.

Figure 6:
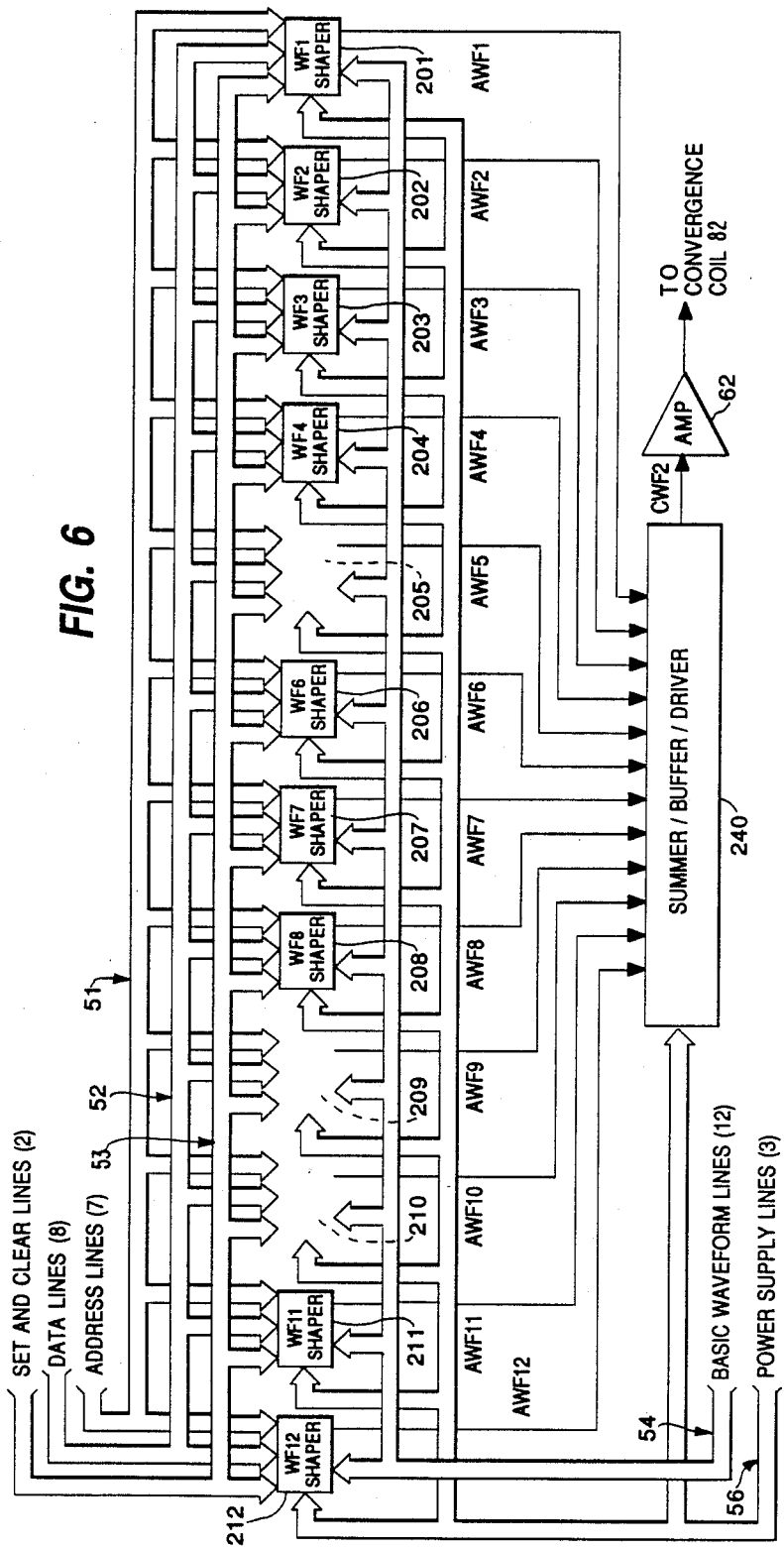
FIG. 6 is a block diagram of the channel processor shown in FIG. 3, as modified in accordance with one embodiment of this invention for developing a composite deflection waveform for the channel 2, blue vertical convergence coil.

A block diagram of one embodiment of the channel 2 processor is shown in FIG. 6. This embodiment of the channel 2 processor is identical to that shown in FIG. 3, except that in accordance with the chart shown in FIG. 5, and an aspect of the invention, the fifth, ninth and tenth waveform shapers, 205, 209 and 210, respectively, have been eliminated. Accordingly, in actually building this configuration on a circuit card or in an integrated circuit, the channel 2 processor need be provided only with 9 waveform shapers. Those that remain will be in accordance with the circuit shown in FIG. 4, and each may comprise a shift register, a scale modifying circuit and a gain modifying circuit. The savings in parts for all six of the channels is substantial, as only forty waveform shapers may actually be required, rather than the seventy-two waveform shapers which would otherwise be necessary. This reduction is a considerable source of savings, and simplifies the task of building the system into only one or a small number of integrated circuits. A channel 1 processor may have the sixth, eighth, and eleventh waveform shapers eliminated. A channel 3 processor may have the sixth, eighth and eleventh waveform shapers eliminated. The fourth channel may have the fifth, ninth and tenth waveform shapers eliminated. The fifth channel may utilize only the fifth and seventh waveform shapers, eliminating the rest. The channel 6 processor may utilize only the sixth and eleventh waveform shapers, eliminating the rest.

Figure 7:
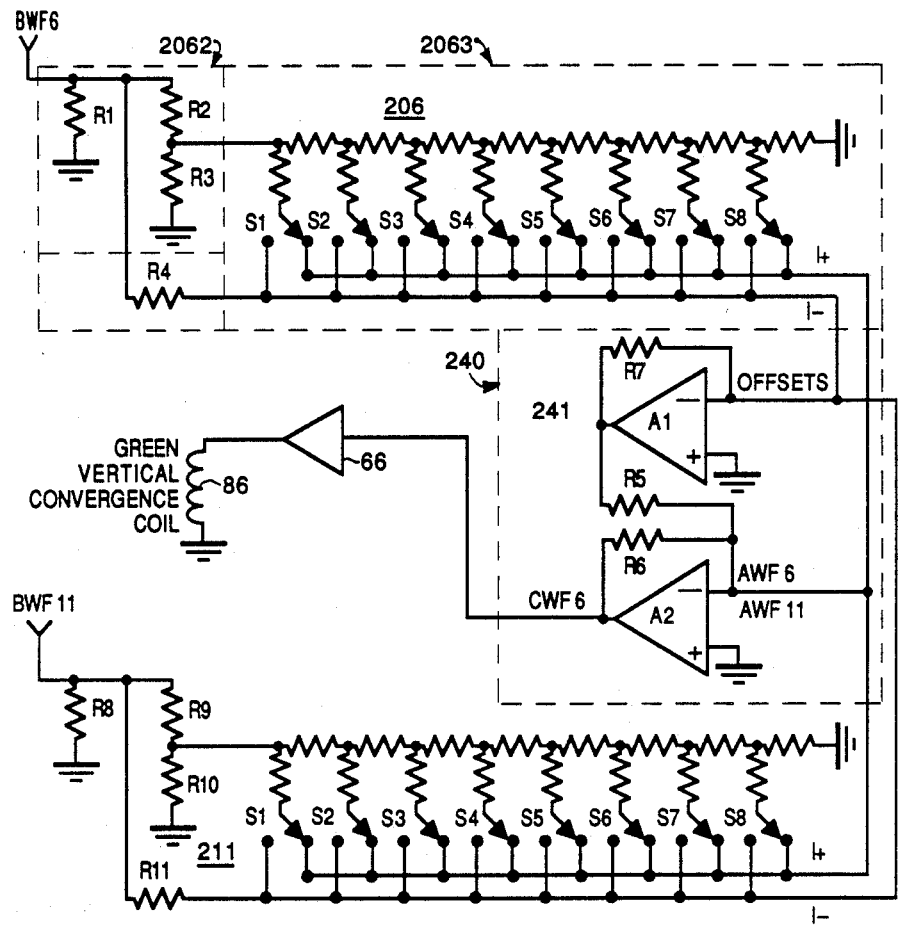
FIG. 7 is a circuit diagram for an embodiment of the waveform shaper circuits used by channel 6 for generating the composite deflection waveform for driving the green vertical convergence coil.

A suitable circuit component diagram for part of the sixth channel processor 26 is shown in FIG. 7. Channel processor 26 comprises a sixth waveform shaper 206, an eleventh waveform shaper 211 and a summer/buffer/driver 240. As shown in connection with waveform shaper 206, the waveform shaper comprises a scale modifying circuit 2062 and a gain modifying circuit 2063. The WF6 and WF11 shift registers have been omitted for clarity. The output of this summer/buffer/driver 240 is a composite waveform CWF6, which is an input to output amplifier 66. Output amplifier 66 drives convergence coil 86, corresponding to the vertical coil of the convergence yoke on the green cathode ray tube.

Each basic waveform may be fed to a scale modifying circuit or network corresponding to network 2062 to establish the range of amplitude of that waveform into that particular channel. This makes it possible for all of the programmable gain modifying circuits or stages to be identical to one another. As shown, there is a scaling network for every gain stage, that is, one for every component of every output channel. In accordance with one aspect of invention, the system may be implemented by incorporation into an integrated circuit. It may be desirable to DC couple the signal path inside the integrated circuit, from the input pins to the output of the summing amplifiers, with DC and AC gains being the same. Some of the inputs to the integrated circuit may be externally AC coupled. Termination resistors are therefore provided at every such input, to set the DC level to zero.

With reference to modification of the sixth basic waveform, BWF6, the input is terminated to ground by resistor R1, and fed into the scale modifying circuit or network 2062 formed by resistor R2 and resistor R3, a resistive dividing network. This scaling network will set the range of gain for this particular waveform into this particular channel. This basic waveform will also be connected to all of the scaling networks in any other of the channels which require the sixth basic waveform. It is likely that the scale factor applied in any one channel will be different from the scale factor applied to that same basic waveform in every other channel.

The output of the scale modifying circuit 2062 is fed into a programmable, remotely controllable gain modifying circuit 2063. The gain modifying circuit may be a multiplying digital-to-analog converter DAC in which the controlled signal is fed into the reference voltage input. A register WF6 holds the desired value of the gain for that particular gain modifying circuit. In general, the gain range necessary for each stage extends into positive and negative values, that is, the input waveform may need to be added or subtracted from the output of a given channel. Since the gain range is not necessarily symmetrical about zero, a provision must be made to offset this range either to the positive or negative direction.

The programmable gain stage or modifying circuit 2063 may comprise an R-2R network with a set of bidirectional switches S1 through S8. The R-2R network has two current outputs, labelled I+ and I−, which carry complementary currents. The sum of the currents in these two outputs is always the voltage into the digital-to-analog converter, divided by the resistance of the digital-to-analog converter, irrespective of the switch setting. The digital setting of the switches will determine the portion of the current that goes to each of the outputs. At one end of the range, corresponding to 00hex, all of the current goes to the I+ output. At the other end of the range, corresponding to FFhex, all of the current goes out of the I− output. At the midpoint of the range, corresponding to 80 hex, the two output currents are essentially the same, producing cancelling effects in the outputs. The scale modifying circuit and the gain modifying circuit for the eleventh basic waveform, part of waveshaper 211, is identical in form to the corresponding circuits of waveshaper 206. In accordance with the design objective of identical gain modifying circuits, the resistive divider formed by resistors R9 and R10 will likely be different from resistors R2 and R3, whereas the R-2R network will be identical.

The outputs of the R-2R networks are connected to the current summing points of the output amplifier 240. The amplifier may be implemented with two operational amplifiers A1 and A2. The two operational amplifiers accomplish the complementary gains necessary for the I+ and I− outputs of the R-2R networks. Operational amplifier A1 converts the current of the I− terminal to a voltage at point 241. Resistor R5 converts this voltage to a current fed into the noninserting terminal of operational amplifier A2. The effect is a polarity inversion of I− before it is added to I+ at the inverting input of operational amplifier A2. In order for the R-2R networks to operate properly, the I+ and I− terminals must be held at ground potential. This may be accomplished with the virtual ground of the inverting inputs of the operational amplifiers, since the noninverting inputs are grounded. Moreover, as the output waveforms must be able to swing above and below ground, the operational amplifiers must have positive and negative power supplies.

Resistor R4 of waveshaper 206 and resistor R11 of waveshaper 211 provide the necessary offset for each of the gain ranges, feeding a portion of the input waveform directly to the summing node of the output amplifier. This offset is to the positive direction in the circuit of FIG. 7.

In this particular embodiment, the WF6 shift register, which is omitted for purposes of clarity, is an eight bit shift register. Each of the eight bits controls one of the bidirectional switches S1 through S8. If the flexibility of a completely remotely controllable waveform generator were required, with regard to an ability to remotely program the scale modifying circuits, the scale modifying circuits may also be a R-2R network having a plurality of bidirectional switches. Appropriate control can be provided by having a second eight bit shift register associated with each scale modifying circuit, or by having both scale and gain modifying circuits controlled by a sixteen bit shift register. Alternatively, the output of the shift register may be used to control a binary to decimal counter, or decoder. One eight bit shift register, for example, could then select one or more of 256 operating factors for controlling both the scale and gain adjustments of the basic waveforms. In such an embodiment, provision must be made for applying a scale factor or a gain factor of zero, so that unnecessary waveforms can be eliminated. Alternatively, an additional controllable gate stage may be provided for selecting specific adjusted waveforms as inputs to the summer/buffer/driver. However, such additional levels of control may not be consistent with the existing digital control architecture of digitally controlled televisions.

It will also be appreciated that the invention may have uses other than generating corrective waveforms for convergence yoke deflection coils in projection televisions. For example, the invention may be embodied as a custom analog waveform generating module suitable for use in televisions, video recorders and the like, of the kind having a digital control architecture for controlling one or more other aspects of such apparatus. Such a module may be single channel or multi-channel, providing the advantages of digital control and adjustment, and avoiding the expense of fully digital signal generation. Such a custom waveform may be used to provide side pincushion correction, trapezoid correction and/or width correction.

A custom analog waveform generating module for signal processors in televisions, video recorders and the like, having digital control architecture, may comprise an analog circuit source for generating a plurality of basic waveforms, a plurality of means responsive to digital control signals for respectively modifying the basic waveforms, each according to one of a plurality of predetermined analog operations, and an analog circuit, for example a summing circuit, for combining the modified waveforms to form a specifically configured composite waveform. The module may also comprise means for storing a digital setting for controlling each of the modifying means, for example, a shift register; and, a digital processor, for example a decoder, for loading the digital settings into the storing means in accordance with information provided over the digital control architecture of the host apparatus.

What is claimed is:

1. A multiple deflection waveform generator, comprising:
    an analog source for generating a plurality of basic waveforms having different waveshapes;
    a plurality of signal processors coupled to the analog circuit source and each comprising:
        a plurality of means for modifying different ones of the basic waveforms by factors of scale and gain to produce modified waveforms, each modified waveform having substantially the same waveshape as when generated by the analog source but a different amplitude, at least one of the scale and gain factors being modified according to one of a plurality of predetermined operations;
        means responsive to digital control signals for setting each of the modifying means to select one of the predetermined operating conditions; and,
        means for combining different ones of the modified waveforms to develop a specifically configured composite deflection waveform; and,
    means, for generating the digital control signals for operating the modifying means.

2. The multiple deflection waveform generator of claim 1, wherein the means for generating the digital control signals comprises:
    means for storing the digital control signals;
    means for loading the digital control signals into the storing means; and,
    means for transmitting the digital control signals to the modifying means.

3. The multiple deflection waveform generator of claim 1, wherein each of the processes comprises:
    a modifying circuit for each basic waveform necessary for developing the composite waveform of that processor;
    a digital register coupled to each of the modifying circuits for storing the setting; and,
    an analog summing circuit coupled to all of the modifying circuits.

4. The multiple deflection waveform generator of claim 2, wherein each of the processors comprises:
    a modifying circuit for each basic waveform necessary for developing the composite waveform of that processor;
    a digital register coupled to each of the modifying circuit for storing the setting; and,
    an analog summing circuit coupled to all of the modifying circuits.

5. The multiple deflection waveform generator of claim 2, wherein the storing means comprises a nonvolatile memory.

6. The multiple deflection waveform generator of claim 1, wherein the means for setting the modifying means comprises a nonvolatile memory.

7. The waveform generator of claim 1, wherein each of the processors comprises:
    sets of first and second modifying circuits for respectively altering the scale and gain of one of the basic waveforms; and,
    a shift register for each set for selecting one of the predetermined operating conditions for one of the first and second modifying circuits responsive to the digital control signals.

8. The waveform generator of claim 7, wherein an operating condition for the other one of the first and second modifying circuits is preselected and fixed.

9. The waveform generator of claim 7, further comprising another shift register for each set for selecting one of the predetermined operating conditions for the other of the first and second modifying circuits.

10. A digitally controlled convergence system, comprising:
    an analog source for generating a plurality of basic deflection waveforms having different waveshapes;
    a plurality of signal processors coupled to the analog circuit source and each comprising:
        means for modifying selected ones of the basic deflection waveforms by factors of scale and gain to produce modified waveforms, each modified waveform having substantially the same waveshape as when generated by the analog source but a different amplitude, at least one of the scale and gain factors being modified according to one of a plurality of predetermined operations;

means responsive to digital control signals for setting each of the modifying means to select one of the predetermined operating conditions; and, means for combining different ones of the selected modified waveforms to develop a specifically configured composite deflection waveform for driving a deflection coil in a convergence yoke; and, means for generating the digital control signals for remotely operating the modifying means.

11. The convergence control system of claim 10, wherein each of the processors further comprises:

a modifying circuit for each of the selected basic waveforms;

a digital register coupled to each of the modifying circuits for storing the setting; and, an analog summing circuit coupled to all of the modifying circuits.

12. The convergence control system of claim 10, wherein each of the processors comprises:

sets of scale and gain modifying circuits for respectively altering the scale and gain of one of the basic waveforms; and, a shift register for each set for selecting one of the predetermined operating conditions for one of the scale and gain modifying circuits.

13. The convergence control system of claim 12, wherein an operating condition for the other one of the scale and gain modifying circuits is preselected and fixed.

14. The convergence control system of claim 12, further comprising another register for each set for selecting one of the predetermined operating conditions for the other of the scale and gain modifying circuits.

15. The convergence control system of claim 12, wherein each of the scale modifying circuits comprises a resistive dividing network.

16. The convergence control system of claim 12, wherein each of the gain modifying circuits comprises an R-2R network with a plurality of switch means.

17. An analog waveform generating module, adapted to operate within televisions, video recorders and the like having a digital control architecture, comprising:

an analog circuit source for generating a plurality of basic waveforms having different waveshapes;

respective pluralities of first and second means for modifying different ones of the basic waveforms to produce modified waveforms, each modified waveform having substantially the same waveshape as when generated by the analog source but a different amplitude;

one of the respective pluralities of first and second modifying means being responsive to digital control signals for respectively modifying the amplitudes of the basic waveforms by one of scale and gain factors, according to one of a plurality of predetermined operations and the other of the respective pluralities of first and second modifying means further modifying the amplitudes of the basic waveforms by the other one of the scale and gain factors;

means for storing a digital setting for controlling each of the plurality of first modifying means;

an analog circuit for combining the scale and gain modified waveforms to form a specifically configured composite waveform; and, a digital processor for loading the digital settings into the storing means in accordance with information provided by the digital control architecture.

18. The analog waveform generating module of claim 17, wherein the digital processor comprises:

a decoder for changing a serial data stream received from the digital control architecture into a parallel data format; and, a parallel data bus connecting the decoder with each of the storing means.

19. The analog waveform generating module of claim 17, wherein each of the plurality of first modifying means comprises a scale modifying circuit for altering the scale of one of the basic waveforms and each of the plurality of second modifying means comprises a scale modifying circuit for altering the scale of the same one of the basic waveforms.

20. The analog waveform generating module of claim 19, wherein the scale modifying circuits comprise resistive dividing networks; and, the gain modifying circuits comprise R-2R networks, each with a plurality of switch means.

21. The analog waveform generating module of claim 17, wherein an operating condition for each of the second modifying means is preselected and fixed.

22. The analog waveform generating module of claim 17, comprising a plurality of analog summing circuits for generating a plurality of specifically configured composite waveforms.

23. A composite waveform generator, comprising:

an analog source for generating at least two basic waveforms having different waveshapes;

means associated with each of the least two basic waveforms for modifying the associated basic waveform by factors of scale and gain to produce a modified waveform having substantially the same waveshape as when generated by the analog source but a different amplitude;

a digital shift register for setting each of the scale and gain factors according to one of a plurality of predetermined operating conditions; and, means for combining the modified waveforms to develop a specifically configured composite deflection waveform.

24. The composite waveform generator of claim 23 comprising:

a scale modifying circuit for altering the scale of each of the basic waveforms;

a gain modifying circuit for altering the gain of the same one of the basic waveforms; and, an analog summing circuit coupled to all of the gain modifying circuits.

25. The composite waveform generator of claim 24, wherein:

the scale modifying circuits comprise resistive dividing networks;

the gain modifying circuits comprise R-2R networks, each with a plurality of switch means coupled to the shift register; and, the analog summing circuit comprises an operational amplifier.

* * * * *